United States Patent
Nakata

(10) Patent No.: US 7,915,913 B2
(45) Date of Patent: Mar. 29, 2011

(54) TERMINATION RESISTANCE ADJUSTING CIRCUIT

(75) Inventor: Masashi Nakata, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 12/774,341

(22) Filed: May 5, 2010

(65) Prior Publication Data
US 2010/0289521 A1   Nov. 18, 2010

(30) Foreign Application Priority Data
May 18, 2009   (JP) .................. 2009-119671

(51) Int. Cl.
*H03K 17/16* (2006.01)
*H03K 19/094* (2006.01)

(52) U.S. Cl. ............ 326/30; 326/33; 326/34; 326/86

(58) Field of Classification Search .......... None
See application file for complete search history.

(56) References Cited

U.S. PATENT DOCUMENTS

| | | | |
|---|---|---|---|
| 5,559,448 A * | 9/1996 | Koenig ............... | 326/30 |
| 6,556,039 B2 | 4/2003 | Nagano et al. | |
| 6,560,290 B2 * | 5/2003 | Ahn et al. ............ | 375/259 |
| 2002/0175700 A1 | 11/2002 | Nagano et al. | |
| 2003/0085736 A1 * | 5/2003 | Tinsley et al. ........ | 326/81 |

FOREIGN PATENT DOCUMENTS

| | | |
|---|---|---|
| JP | 2002-344300 | 11/2002 |
| JP | 2003-204247 | 7/2003 |

* cited by examiner

*Primary Examiner* — Anh Q Tran
(74) *Attorney, Agent, or Firm* — Young & Thompson

(57) ABSTRACT

A termination resistance adjusting circuit includes a first termination resistor circuit, a second termination resistor circuit connected in parallel with the first termination resistor circuit, a resistor circuit for adjustment that adjusts resistances of the first and second termination resistor circuits, a first amplifier circuit that receives a first voltage determined by the resistor circuit for adjustment and a second voltage determined by a reference resistor connected externally, equalizes the first and second voltages, and outputs a resistance adjusting signal to the first and second termination resistor circuits, first and second terminals connected to the first and second termination resistor circuits respectively, and a second amplifier circuit that receives a voltage based on a common voltage of a differential signal supplied to the first and second terminals, and the first or second voltage, and equalizes the voltage based on the common voltage and the first or second voltage.

10 Claims, 11 Drawing Sheets

TERMINATION RESISTANCE ADJUSTING CIRCUIT

INCORPORATION BY REFERENCE

This application is based upon and claims the benefit of priority from Japanese patent application No. 2009-119671, filed on May 18, 2009, the disclosure of which is incorporated herein in its entirety by reference.

BACKGROUND

1. Field of the Invention

The present invention relates to a termination resistance adjusting circuit for adjusting a termination resistance used in an interface circuit, for example, according to an external resistor.

2. Description of Related Art

For a termination resistor used in an interface circuit, 50Ω±10% of absolute value accuracy is required for the HDMI specification, for example. As the process variation of a resistance of a semiconductor resistor, such as diffusion layer resistor and polysilicon resistor, exceeds 10%, the above specification cannot be satisfied and they cannot be used as a termination resistor.

For the abovementioned problem, Japanese Unexamined Patent Application Publication No. 2003-204247 discloses, in FIG. 3, a variable resistor circuit which can specify a resistance according to an external resistor with high absolute value accuracy of a resistance. If an input or output signal supplied with this specified resistance is a differential signal, the specified resistance could fluctuate by fluctuation of the common voltage of the differential signal. However, Japanese Unexamined Patent Application Publication No. 2003-204247 does not disclose anything about the fluctuation of the common voltage.

Japanese Unexamined Patent Application Publication No. 2002-344300 discloses, in FIG. 4, an impedance adjusting circuit which can adjust a termination resistance according to an external resistor with high absolute value accuracy of resistance, and also keep the termination resistor to be constant even if the common voltage of an input differential signals changes.

SUMMARY

However, the present inventor has found a problem that in the impedance adjusting circuit disclosed in Japanese Unexamined Patent Application Publication No. 2002-344300, that as the circuit size is large, an occupied area and the power consumption are also large. Further, as the circuit size is large, the number of component also increases, and the influence of the process variation is accumulated, thereby reducing the accuracy of the adjusted termination resistance.

An exemplary aspect of the invention is a termination resistance adjusting circuit that includes a first termination resistor circuit that has a variable resistance, a second termination resistor circuit that has a variable resistance, and is connected in parallel with the first termination resistor circuit, a resistor circuit for adjustment that adjusts the resistances of the first and second termination resistor circuits, a first amplifier circuit that receives a first voltage and a second voltage, equalizes the first and second voltages, and outputs a resistance adjusting signal to the first and second termination resistor circuits, where the first voltage is determined by the resistor circuit for adjustment, and the second voltage is determined by a reference resistor connected externally, a first terminal connected to the first termination resistor circuit, a second terminal connected to the second termination resistor circuit, and a second amplifier circuit that receives a voltage based on a common voltage of a differential signal, and one of the first and second voltages, and equalizes the voltage based on the common voltage and one of the first and second voltages, where the differential signal is supplied to the first and second terminals.

The present invention can provide a termination resistance adjusting circuit with simple circuit configuration that can keep the termination resistance to be constant even if the common voltage of the input differential signals changes.

BRIEF DESCRIPTION OF THE DRAWINGS

The above and other exemplary aspects, advantages and features will be more apparent from the following description of certain exemplary embodiments taken in conjunction with the accompanying drawings, in which.

DETAILED DESCRIPTION OF THE EXEMPLARY EMBODIMENTS

Hereinafter, detailed exemplary embodiments incorporating the present invention are described in detail with reference to the drawings. However, the present invention is not necessarily limited to the following exemplary embodiments. For the clarity of the explanation, the following descriptions and drawings are simplified as appropriate.

First Exemplary Embodiment

Figure 1:
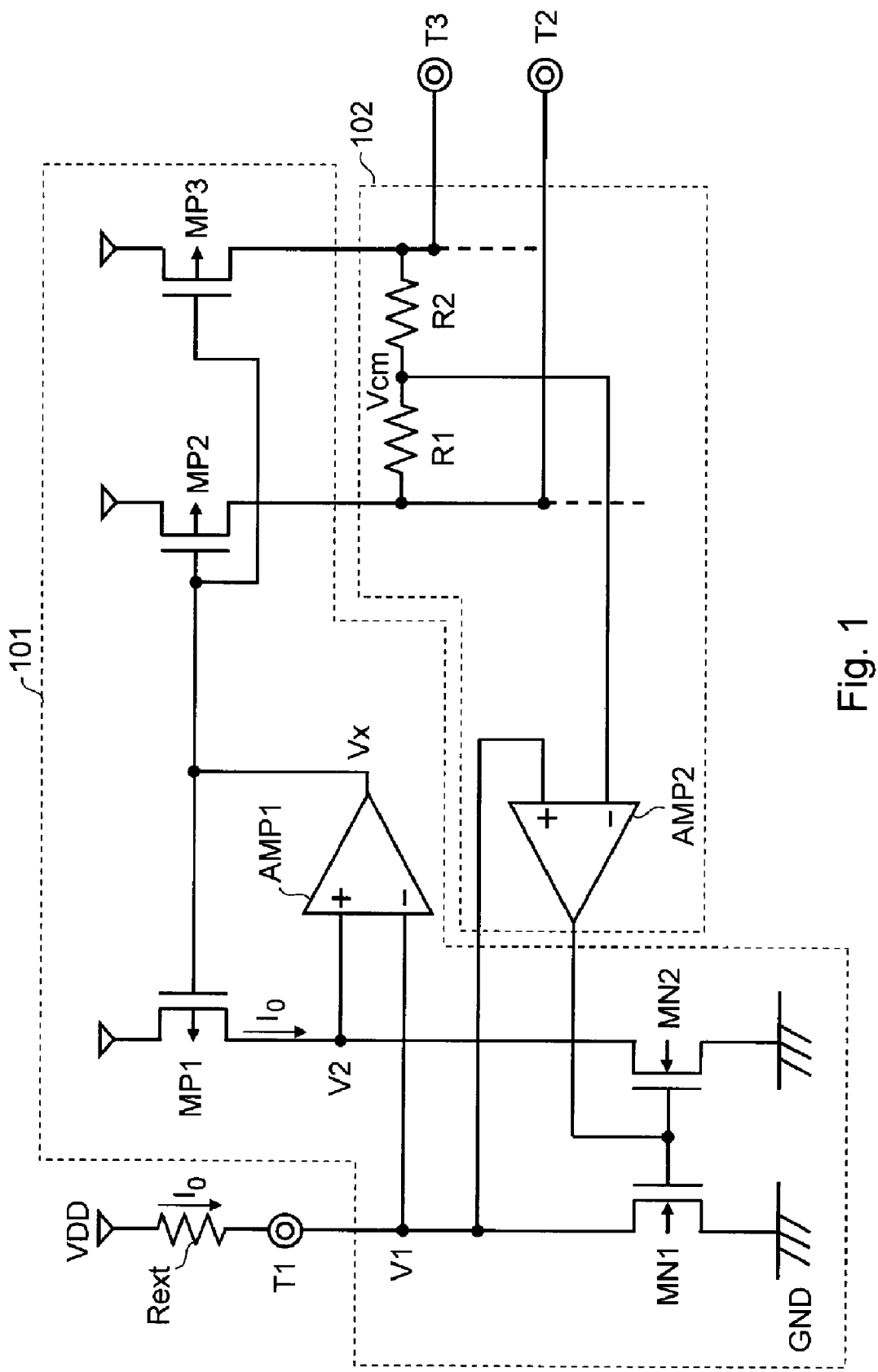
FIG. 1 is a circuit diagram of a termination resistance adjusting circuit according to a first exemplary embodiment.

FIG. 1 is a circuit diagram of a termination resistance adjusting circuit according to a first exemplary embodiment of the present invention. The termination resistance adjusting circuit is provided with an external resistor Rext, a channel resistance control unit 101, and a common voltage detection unit 102.

The channel resistance control unit 101 is provided with NMOS transistors MN1 and MN2, PMOS transistors MP1, MP2, and MP3, and an amplifier AMP1. The common voltage detection unit 102 is provided with resistors R1 and R2, and an amplifier AMP2.

The external resistor Rext is the resistor connected externally to the semiconductor chip. The external resistor Rext includes a high accuracy (for example, about ±1%) resistance. As illustrated in FIG. 1, in the termination resistance adjusting circuit according this exemplary embodiment, one end of the external resistor Rext is connected to a high potential power supply (VDD). Further, another end of the external resistor Rext is connected to an external terminal T1 of the semiconductor chip.

The external terminal T1 is connected to a drain of the NMOS transistor MN1 which composes the channel resistance control unit 101. A source of the NMOS transistor MN1 is connected to a low potential power supply (GND). A gate of the NMOS transistor MN1 and a gate of the NMOS transistor MN2 are connected to each other. A source of the NMOS transistor MN2 is connected to the grand GND in a similar way as the source of the NMOS transistor MN1. A drain of the NMOS transistor MN2 is connected to a drain of the PMOS transistor MP1. The sizes of the NMOS transistors MN1 and MN2 are the same, and they both operate in the saturation region.

A source of the PMOS transistor MP1 is connected to the power supply VDD. A gate of the PMOS transistor MP1, a gate of the PMOS transistor MP2, and a gate of the PMOS transistor MP3 are connected to one another. Each source of the PMOS transistors MP2 and MP3 is connected to the power supply VDD in a similar way as the source of the PMOS transistor MP1. The drains of the PMOS transistors MP2 and MP3 are connected to external terminals T2 and T3, respectively. The PMOS transistors MP2 and MP3 are variable resistors with channel resistances adjusted according to the resistance of the external resistor Rext, and function as a termination resistor of an input or output differential signal provided to the external terminals T2 and T3. The sizes of the PMOS transistors MP1, MP2, and MP3 are the same, and they operate in the linear region.

A non-inverting (+) input terminal of the amplifier AMP1 is connected to a node between the drain of the PMOS transistor MP1 and the drain of the NMOS transistor MN2. On the other hand, an inverting (−) input terminal of the amplifier AMP1 is connected to a node between the external terminal T1 and the drain of the NMOS transistor MN1. Then, an output terminal of the amplifier AMP1 is connected in common to the gates of the PMOS transistors MP1, MP2, and MP3. In this exemplary embodiment, the PMOS transistor MP1 is a resistor circuit for adjustment that equalizes the channel resistances of the PMOS transistors MP2 and MP3 which function as a termination resistor with the resistance of the external resistor Rext. The details of the adjusting operation are described later.

Next, one end of the resistor R1, which composes the common voltage detection unit 102, is connected to a node between the drain of the PMOS transistor MP2 and the external terminal T2. One end of the resistor R2 is connected to a node between the drain of the PMOS transistor MP3 and the external terminal T3. Other ends of the resistors R1 and R2 are connected to each other. An input or output differential signal is provided to the external terminals T2 and T3. In the node to which the resistors R1 and R2 are connected, a common voltage of this differential signal is detected. The resistances of the resistors R1 and R2 are sufficiently large values, for example, about 10 kΩ.

An inverting (−) input terminal of the amplifier AMP2 is connected to the node to which the resistors R1 and R2 are connected to each other. On the other hand, a non-inverting (+) input terminal of the amplifier AMP2 is connected to a node between the external terminal T1 and the drain of the NMOS transistor MN1. Then, the output terminal of the amplifier AMP2 is connected in common to the gate of the NMOS transistors MN1 and MN2.

The operation is explained hereinafter.

As described above, the resistors R1 and R2 short-circuit between the external terminals T2 and T3, which are supplied with the differential signal, and a potential between the connection node becomes a common voltage Vcm. The connection node of the resistors R1 and R2, and a node between the external terminal T1 and the drain of the NMOS transistor MN1 are virtually connected by the amplifier AMP2. Then the common voltage Vcm and a potential $V_1$ will be Vcm=$V_1$. Accordingly, a current $I_0$ which flows into the external resistor Rext is obtained by the following equation (1).

$$I_0 = (Vdd - Vcm)/Rext \qquad (1)$$

Further, the node between the external terminal T1 and the drain of the NMOS transistor MN1, and the node between the drain of the PMOS transistor MP1 and the drain of the NMOS transistor MN2 are virtually connected by AMP1. Therefore, Vx is adjusted so that each potential $V_1$ and $V_2$ may be $V_1 = V_2$.

As described above, the sizes of the NMOS transistors MN1 and MN2 are the same, and they operate in the saturation region. Then, the potential output from the amplifier AMP2 is supplied in common to each gate. Accordingly, each of the NMOS transistors MN1 and MN2 composes a current source, and generates the same amount of current $I_0$. Therefore, the current $I_0$ flows into both of the external resistor Rext and the PMOS transistor MP1. Accordingly, a channel resistance Ron_MP1 of the PMOS transistor MP1 is obtained by the following equation (2).

$$Ron\_MP1 = (Vdd - V_2)/I_0 = (Vdd - V_1)/I_0 = Rext \qquad (2)$$

Thus, the channel resistance Ron_MP1 of the PMOS transistor MP1 becomes equal to the external resistor Rext.

Since it is $V_2 = V_1 = Vcm$ as mentioned above, a gate source voltage Vgs and a drain source voltage Vds of the PMOS transistors MP2 and MP3 are the same values as those of the PMOS transistor MP1. The sizes of the PMOS transistors MP1, MP2, and MP3 are the same, and they operate in the linear region each. Therefore, a drain source current Ids of the PMOS transistors MP1, MP2, and MP3 are obtained by the following equation (3).

$$Ids = \mu Cox(W/L)\{(Vgs - Vth)Vds - (1/2)Vds^2\} \qquad (3)$$

In the above equation, μ is carrier mobility, Cox is gate capacitance per unit area, W is channel width, L is channel length, and Vth is threshold voltage.

Therefore, a drain conductance gds of the PMOS transistors MP1, MP2, and MP3 are obtained by the following equation (4).

$$gds = \partial Ids/\partial Vds = \mu Cox(W/L)\{(Vgs - Vth) - Vds\} \qquad (4)$$

The channel resistances of the PMOS transistors MP1, MP2, and MP3, which are respectively Ron_MP1, Ron_MP2, and Ron_MP3, are obtained by the inverse number of the drain conductance gds. This and the equation (2) enable the following equation (5) to be true.

$$1/gds = Ron\_MP3 = Ron\_MP2 = Ron\_MP1 = Rext \qquad (5)$$

Accordingly, the channel resistances Ron_MP2 and Ron_MP3 of the PMOS transistors MP2 and MP3, which compose a termination resistor, become equal to the external resistor Rext. Therefore, a termination resistance with high absolute value accuracy can be generated by a transistor.

Further, as described above, the equation $V_2=V_1=Vcm$ is true, thus this enables suppress the fluctuation of the termination resistance value caused by fluctuation of the common voltage Vcm. Accordingly, a termination resistance with high absolute value accuracy can be realized at any common voltage Vcm.

Figure 4:
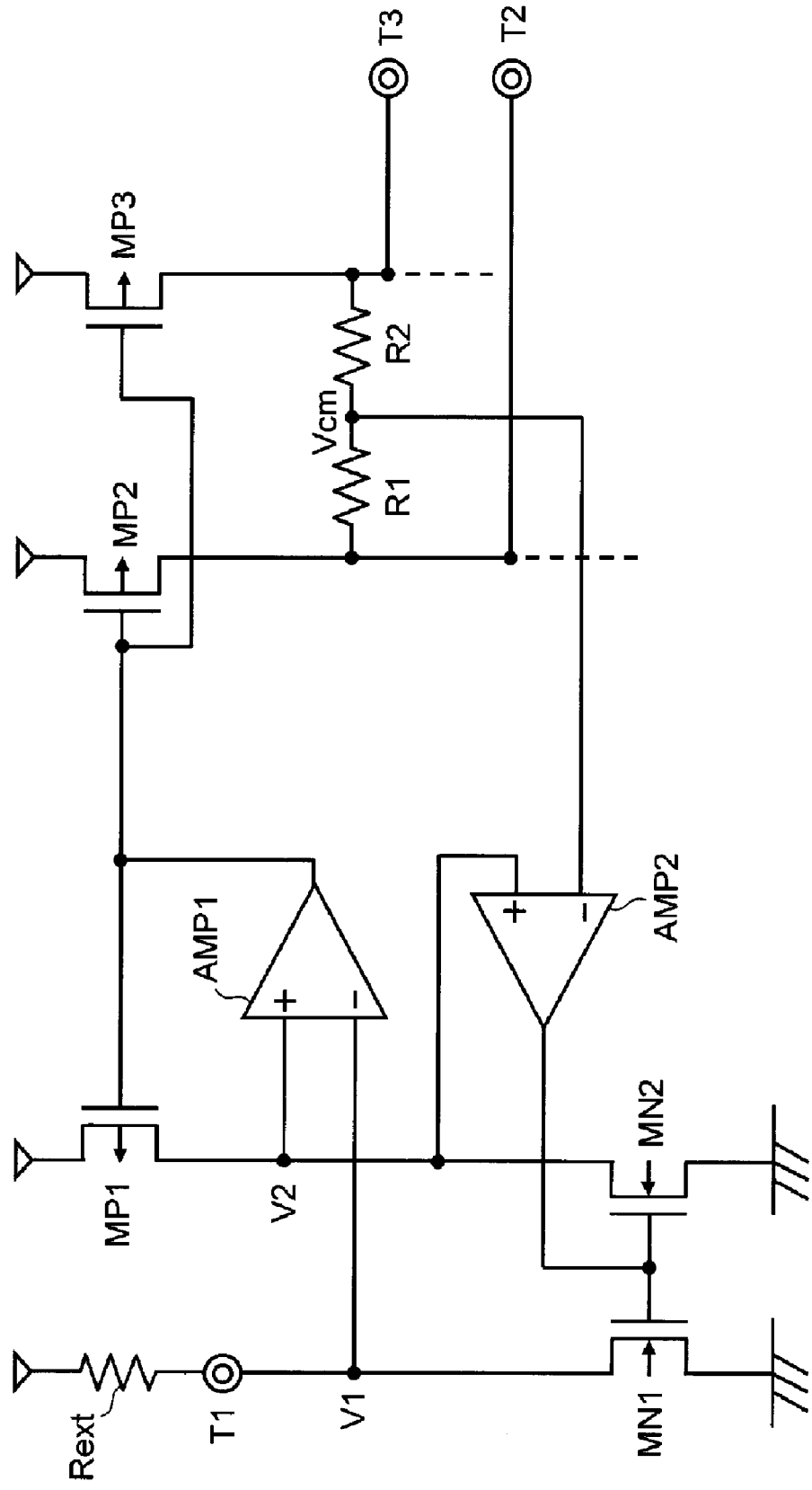
FIG. 4 is a modification of the first exemplary embodiment.

Moreover, the termination resistance adjusting circuit according to this exemplary embodiment has simple circuit configuration, thus enabling to reduce the occupied area and the power consumption as compared to the circuit disclosed in FIG. 4 of Japanese Unexamined Patent Application Publication No. 2002-344300. Furthermore, as the number of component is small, there is a little accumulation of the influence of the process variation. Therefore the accuracy of the termination resistance value to adjust improves. The circuit disclosed in FIG. 4 of Japanese Unexamined Patent Application Publication No. 2002-344300 compares the common voltage of an input differential signal with the reference voltage generated internally, and adjusts the termination resistance value according to the difference therebetween. Accordingly the adjusting accuracy deteriorates as the difference between the common voltage of the input differential signal and the reference voltage increases. There is no such problem in the termination resistance adjusting circuit according to this exemplary embodiment.

Figure 2:
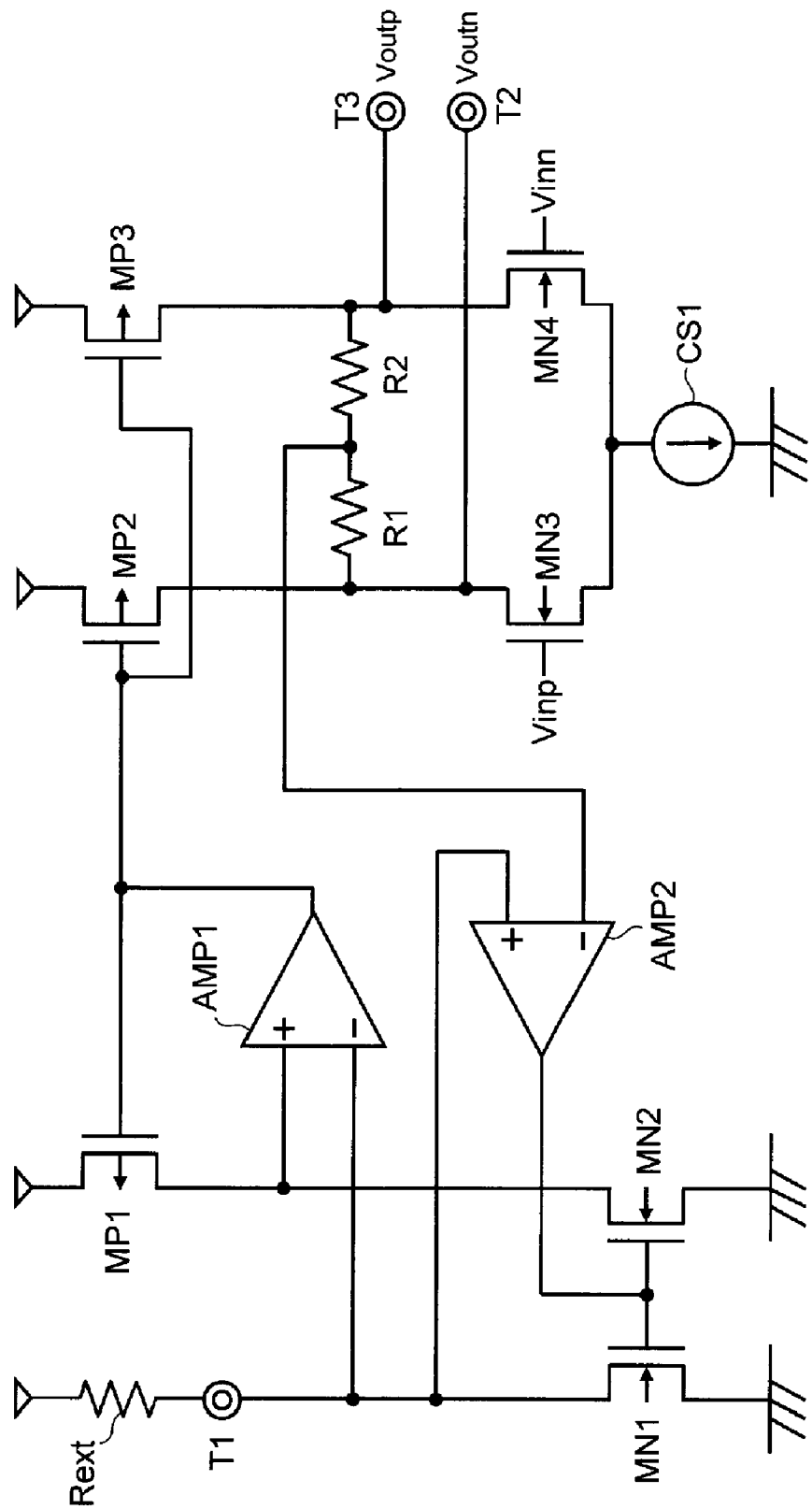
FIG. 2 is a circuit diagram of a transmitter circuit using the termination resistance adjusting circuit of FIG. 1.

FIG. 2 is a circuit diagram of a transmitter circuit using the termination resistance adjusting circuit of FIG. 1. NMOS transistors MN3 and MN4, and a current source CS1 are added to the configuration of FIG. 1. The circuit configuration of FIG. 2 conforms to the specifications such as PCI express and SATA. The NMOS transistors MN3 and MN4 are input pair transistors, in which input signals Vinp and Vinn are input to each gate from an internal circuit formed over the same semiconductor chip. A drain of the NMOS transistor MN3 is connected to the external terminal T2, and outputs an output signal Voutn. A drain of the NMOS transistor MN4 is connected to the external terminal T3, and outputs an output signal Voutp. Both sources of the NMOS transistors MN3 and MN4 are connected to one end of the current source CS1. Then, another end of the current source CS1 is connected to the grand GND.

Figure 3:
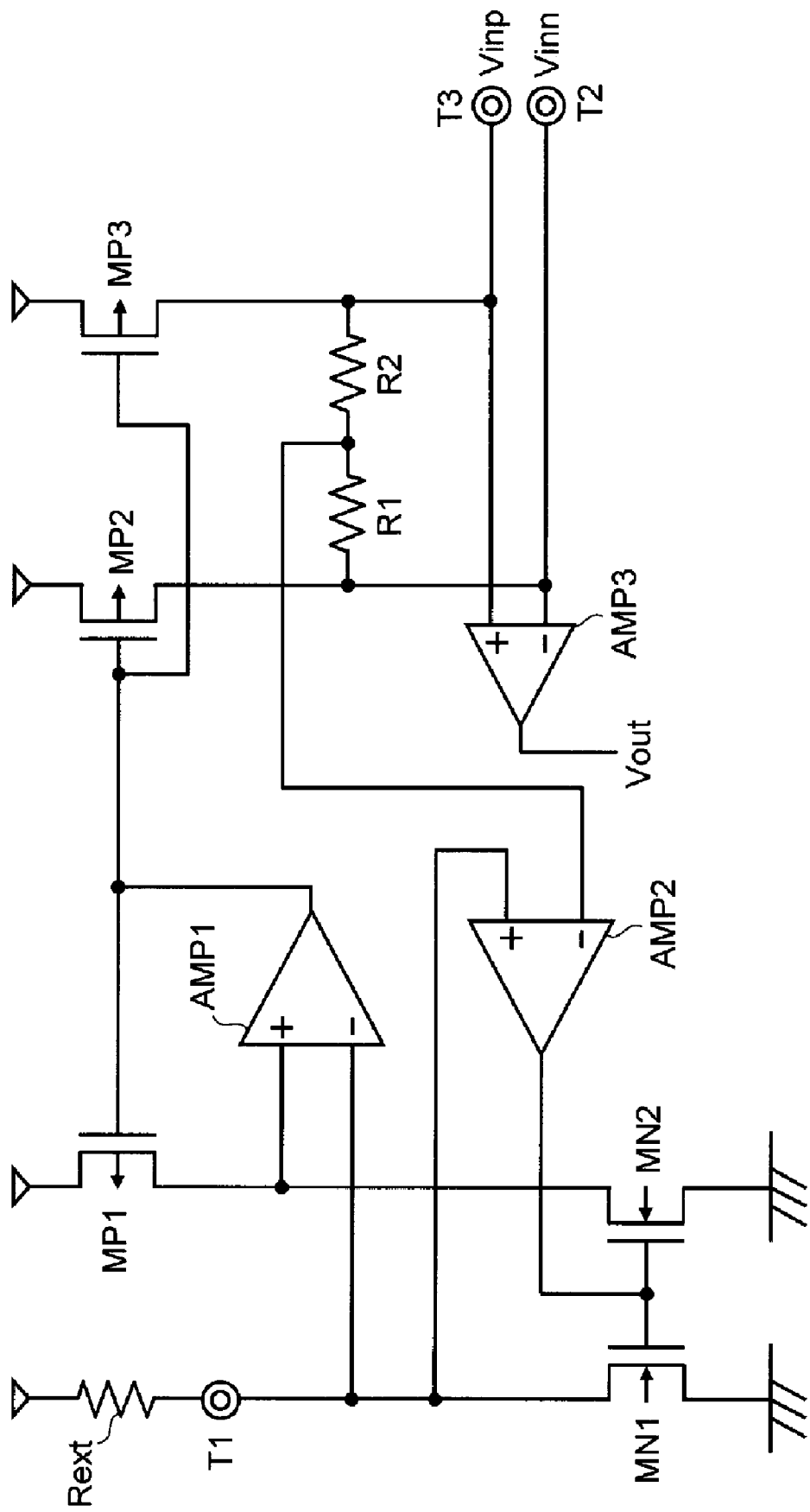
FIG. 3 is a circuit diagram of a receiver circuit using the termination resistance adjusting circuit of FIG. 1.

FIG. 3 is a circuit diagram of a receiver circuit using the termination resistance adjusting circuit of FIG. 1. An amplifier AMP3 is added to the configuration of FIG. 1. The circuit configuration of FIG. 3 conforms to the specifications, such as HDMI. An inverting input terminal of the amplifier AMP3 is connected to the external terminal T2, and inputs the input signal Vinn. A non-inverting input terminal of the amplifier AMP3 is connected to the external terminal T3, and inputs the input signal Vinp. Then, the signal output from the amplifier AMP3 is output to the internal circuit formed over the same semiconductor chip.

FIG. 4 illustrates the modification of this exemplary embodiment. A difference from FIG. 1 is that the non-inverting input terminal of the amplifier AMP1 is connected to the node between the drain of the PMOS transistor MP1 and the drain of the NMOS transistor MN2. Other points are the same as FIG. 1, thus the explanation is omitted. As the equation $V_2=V_1=Vcm$ is true, the same exemplary advantage as FIG. 1 can be achieved.

Second Exemplary Embodiment

Figure 5:
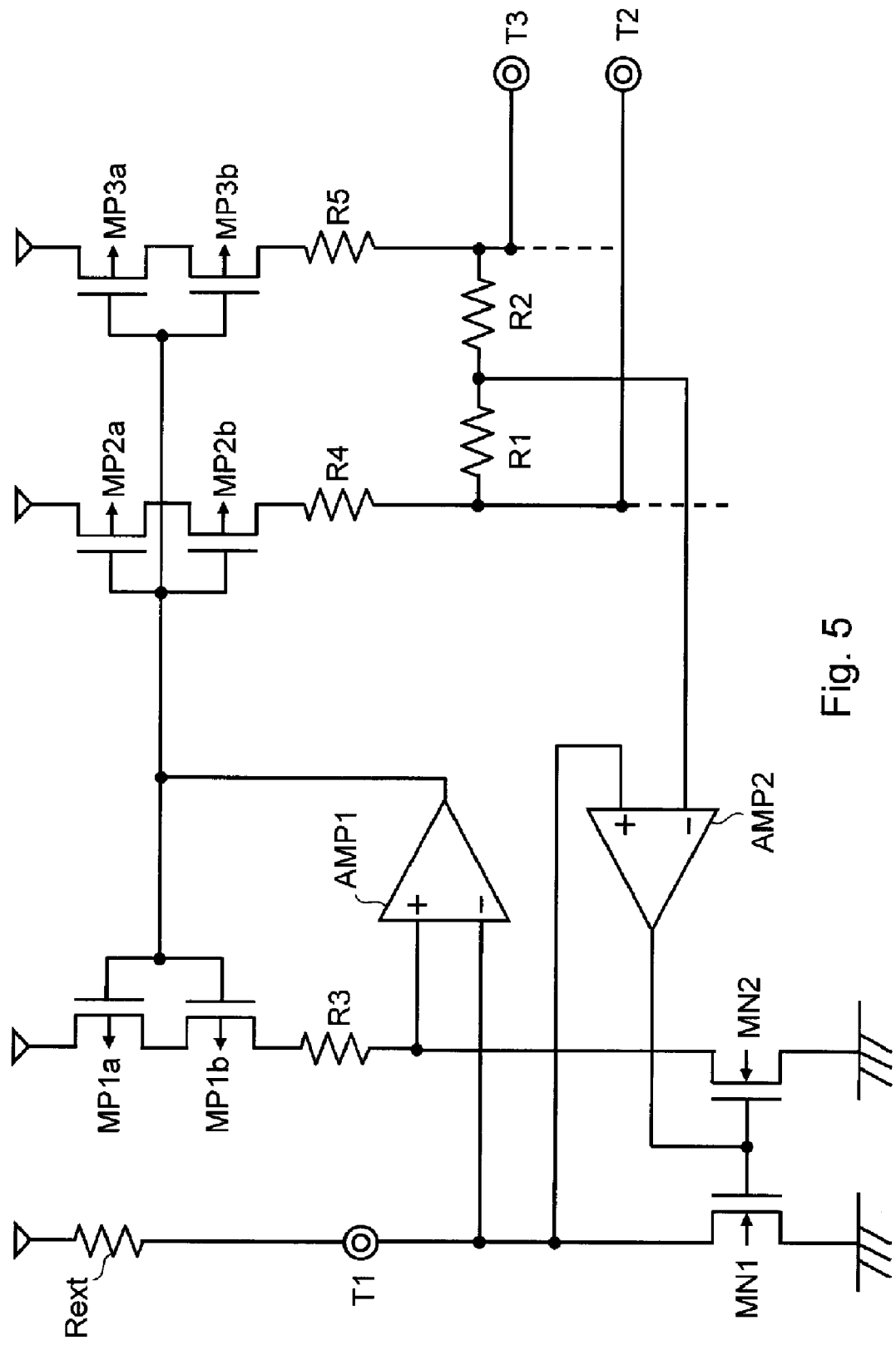
FIG. 5 is a circuit diagram of a termination resistance adjusting circuit according to a second exemplary embodiment.

FIG. 5 is a circuit diagram of a termination resistance adjusting circuit according to a second exemplary embodiment of the present invention. In the first exemplary embodiment, the resistor circuit for adjustment is composed only of the PMOS transistor MP1, whereas the resistor circuit for adjustment in this exemplary embodiment is composed of PMOS transistors MP1a and MP1b. Further, in the first exemplary embodiment, the variable resistor is composed only of the PMOS transistor MP2, whereas the variable resistor in this exemplary embodiment is composed of PMOS transistors MP2a and MP2b. Similarly, in the first exemplary embodiment, the variable resistor is composed only of the PMOS transistor MP3, whereas the variable resistor in this exemplary embodiment is composed of PMOS transistors MP3a and MP3b. Moreover, fixed resistors R3, R4, and R5 are connected in series to drains of the PMOS transistors MP1b, MP2b, and MP3b, respectively. The resistances of the resistors R3, R4, and R5 are equal.

Specifically, a source of the PMOS transistor MP1a is connected to the power supply VDD. A drain of the PMOS transistor MP1a is connected to the source of the PMOS transistor MP1b. The drain of the PMOS transistor MP1b is connected to one end of the resistor R3. The other end of the resistor R3 is connected to the drain of the NMOS transistor MN2. Then, the node between the resistor R3 and the drain of the NMOS transistor MN2 is connected to the non-inverting input terminal of the amplifier AMP1. Gates of the PMOS transistors MP1a and MP1b, gates of the PMOS transistors MP2a and MP2b, and gates of the PMOS transistors MP3a and MP3b are connected to one other.

Sources of the PMOS transistors MP2a and MP3a are connected to the power supply VDD in a similar way as the source of the PMOS transistor MP1a. Drains of the PMOS transistors MP2a and MP3a are connected to sources of the PMOS transistors MP2b and MP3b, respectively. Each drain of the PMOS transistors MP2b and MP3b is connected to one end of the resistors R4 and R5, respectively. Then, the other end of the resistors R4 and R5 is connected to the external terminal T2 and T3, respectively.

The PMOS transistors MP2a and MP2b are variable resistors with channel resistances adjusted according to the resistance of the external resistor Rext, and functions as a termination resistor, along with the resistor R4, for an input or output differential signal provided to the external terminals T2 and T3. Similarly, the PMOS transistors MP3a and MP3b are variable resistors with channel resistances adjusted according to the resistance of the external resistor Rext, and functions as a termination resistor, along with the resistor R5, of an input or output differential signal provided to the external terminals T2 and T3. The sizes of the PMOS transistors MP1a, MP1b, MP2a, MP2b, MP3a, and MP3b are the same, and all of them are operating in the linear region. Other configuration is the same as the termination resistance adjusting circuit of FIG. 1, thus the explanation is omitted.

Figure 6:
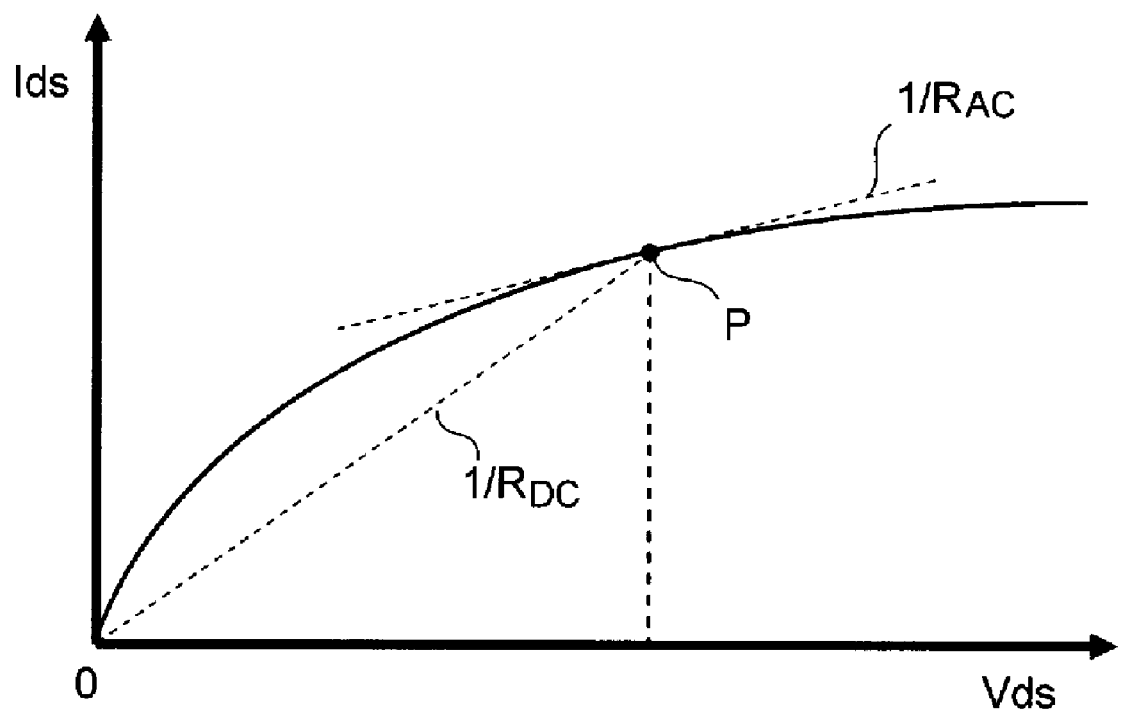
FIG. 6 is a graph illustrating a change of a drain source current Ids to a drain source voltage Vds of a transistor.

FIG. 6 is a graph illustrating the change of the drain source current Ids to the drain source voltage Vds of a transistor. In FIG. 6, the gradient of the line connecting the origin and the point P is the inverse number of the direct current resistance $R_{DC}$. On the other hand, the gradient of the tangent at the point P is the inverse number of a resistance $R_{AC}$ to a small signal. As the drain source voltage Vds increases, the gradients diverge more from each other. Therefore, as in this exemplary embodiment, by using the multiple stage (two stages in this exemplary embodiment) transistor for the resistor circuit for adjustment and the variable resistor to be adjusted, the drain source voltage Vds in one transistor is reduced. Accordingly, as can be seen in FIG. 6, the difference between the direct current resistance $R_{DC}$ and the resistance $R_{AC}$ to a small signal can be made small.

For the resistor circuit for adjustment and the variable resistor to be adjusted, by connecting the resistors R3, R4, and R5 in series, the drain source voltage Vds in one transistor can be even smaller. Accordingly, the difference between the direct current resistance $R_{DC}$ and the resistance $R_{AC}$ to a small signal can be even smaller.

Third Exemplary Embodiment

Figure 7:
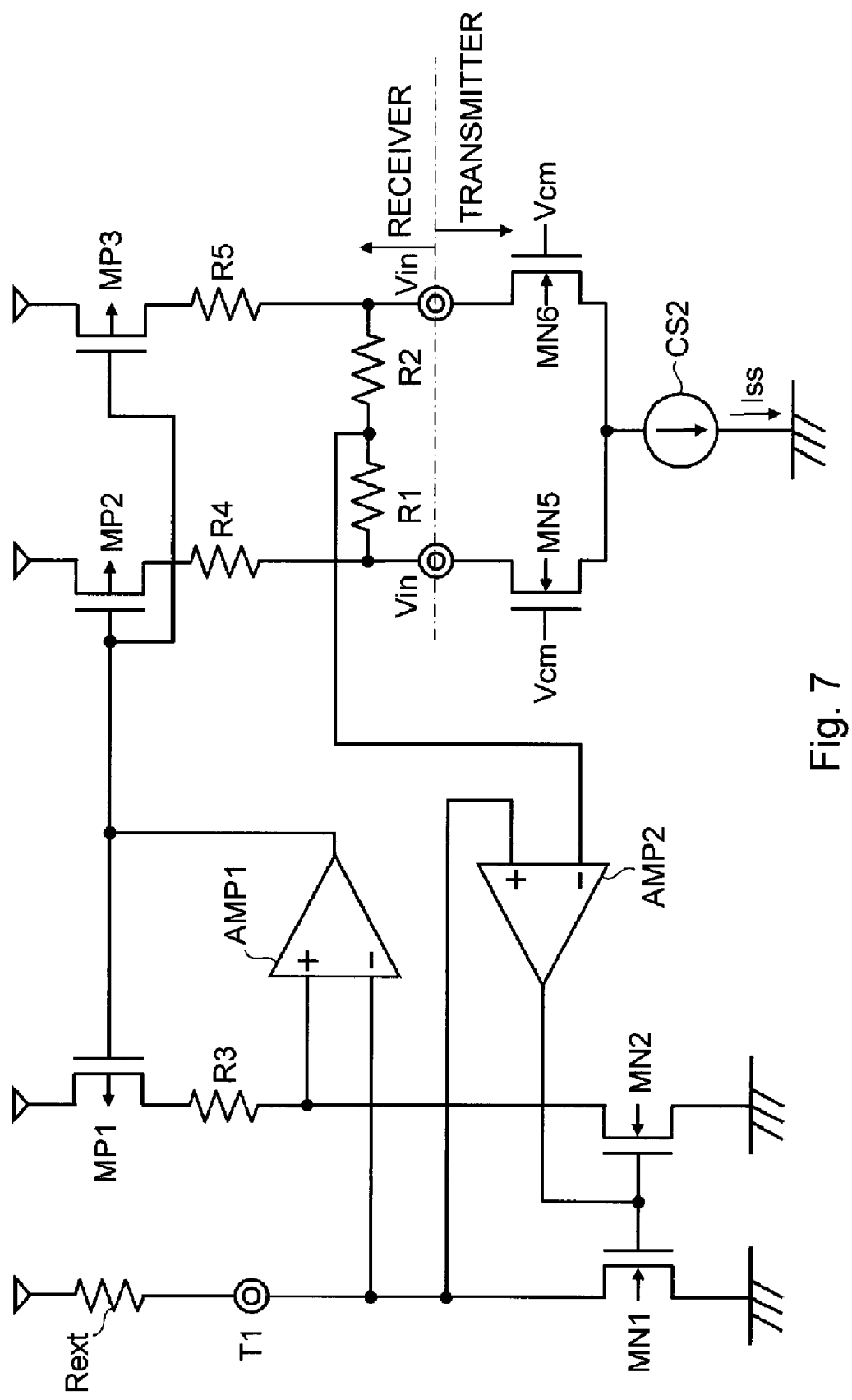
FIG. 7 is a circuit diagram of a termination resistance adjusting circuit according to a third exemplary embodiment.

FIG. 7 is a circuit diagram of a termination resistance adjusting circuit according to a third exemplary embodiment of the present invention. The simulation was performed using this circuit. According to this exemplary embodiment, the fixed resistors R3, R4, and R5 are connected in series respectively to the drains of the PMOS transistors MP1, MP2, and MP3 according to the first exemplary embodiment. The resistors R3, R4, and R5 operate in the same way as in the second exemplary embodiment. The termination resistance adjusting circuit of FIG. 7 is used for the receiver, and is connected to a transmitter formed in another semiconductor chip. This transmitter is provided with NMOS transistors MN5, MN6, and a current source CS2. The NMOS transistors MN5 and MN6 are input pair transistors, which are input with the same common voltage Vcm, not a differential signal, to each gate. The receiver and the transmitter are connected by a cable or the like, but omitted in the drawings.

Figure 8:
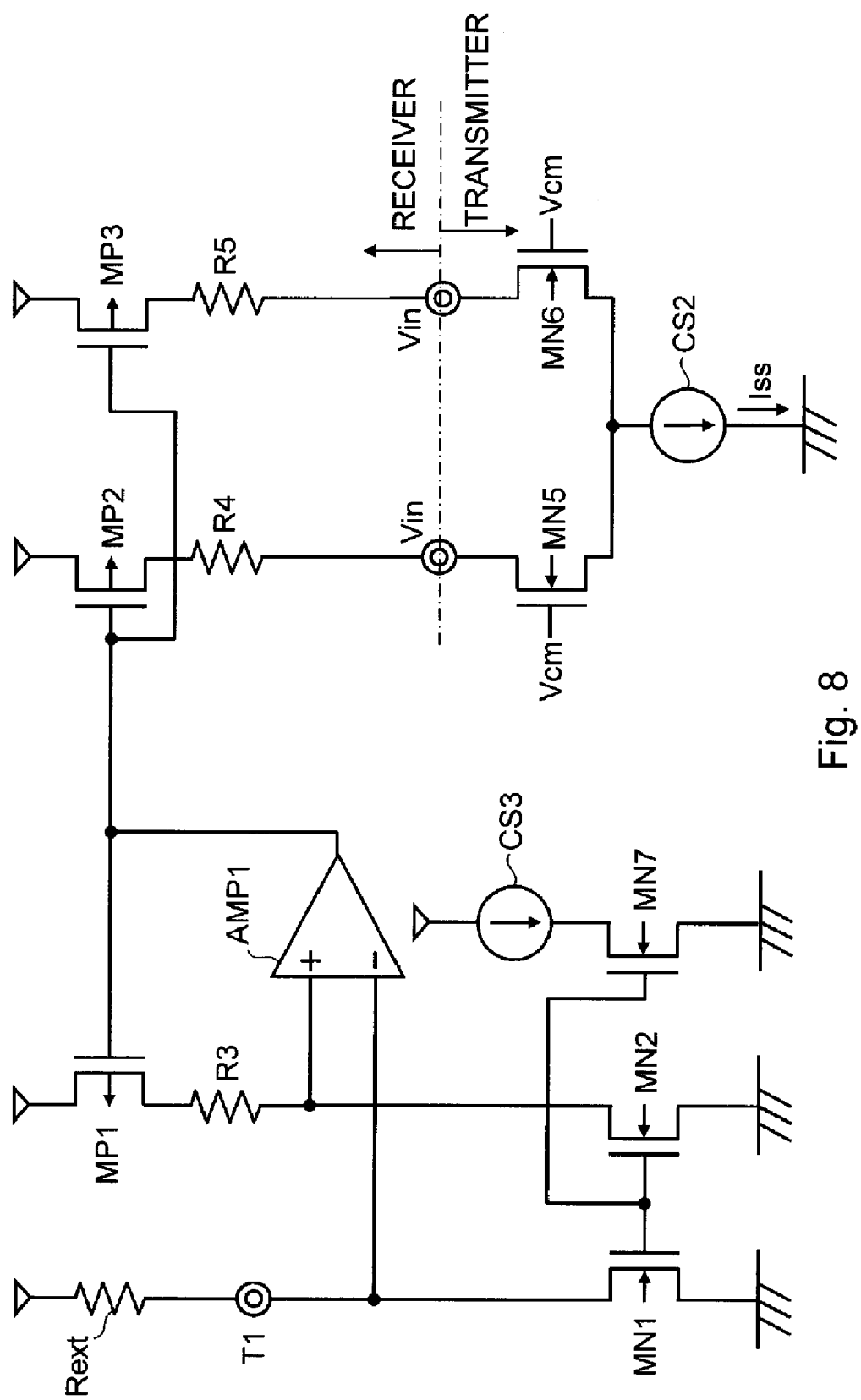
FIG. 8 is a circuit diagram of a termination resistance adjusting circuit according to a comparative example.

FIG. 8 is a circuit diagram of a termination resistance adjusting circuit according to a comparative example. The simulation was performed using this circuit, and compared with the case of FIG. 7. This termination resistance adjusting circuit is not provided with the amplifier AMP2 as compared with the termination resistance adjusting circuit of FIG. 7. Accordingly, the input common voltage Vcm is not fed back to the gates of the NMOS transistors MN1 and MN2 via the amplifier AMP2. The gates of the NMOS transistors MN1 and MN2 are connected to the gate of the NMOS transistor MN7 instead. The source of the NMOS transistor MN7 is connected to the grand GND, and the drain is connected to one end of the current source CS2. Another end of the current source CS2 is connected to the power supply VDD.

Figure 9B:
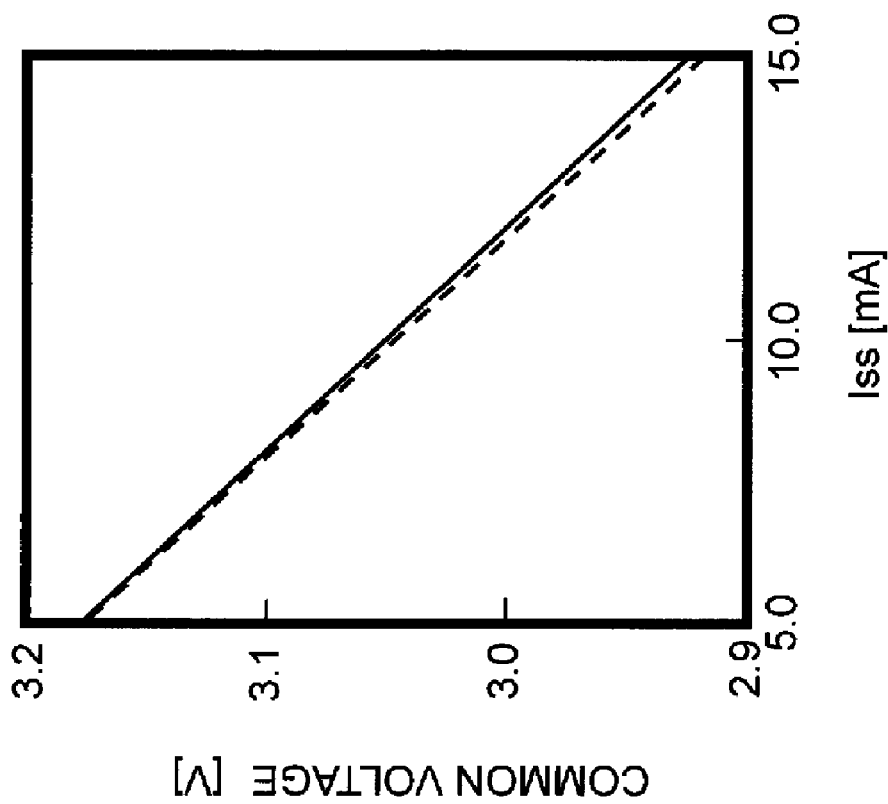
FIG. 9B is a graph illustrating a simulation result of a change of a common voltage Vcm.
Figure 9A:
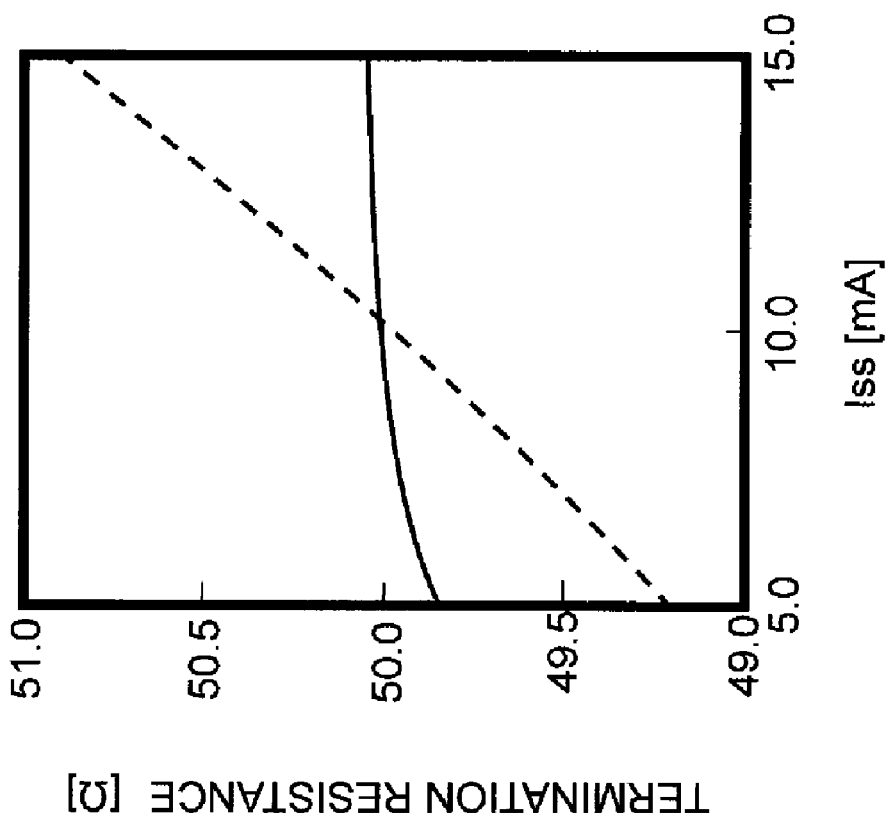
FIG. 9A is a graph illustrating a simulation result of a change of a termination resistance value to a bias current Iss.

FIG. 9A is a graph illustrating the simulation result of the termination resistance value change to a bias current Iss. FIG. 9B is a graph illustrating the simulation result of the change of the common voltage Vcm. In FIGS. 9A and 9B, the solid line indicates the termination resistance adjusting circuit of FIG. 7, and the dashed line indicates the termination resistance adjusting circuit of FIG. 8. As illustrated in FIG. 9B, if the bias current Iss, which has a base value of 10 mA, changes in the range of 5 to 15 mA, the common voltage Vcm changes linearly. Specifically, as the bias current Iss increases, the common voltage Vcm decreases.

Then, as illustrated in FIG. 9A, in the termination resistance adjusting circuit of FIG. 8 according to the comparative example indicated with the dashed line, a termination resistance value changes linearly to a change of the bias current Iss, that is, a change of the common voltage Vcm. Accordingly, the termination resistance value fluctuates by change of the common voltage Vcm. The termination resistance value R can be expressed as R=(Vdd−Vin)/Ids_MP2=(Vdd−Vin)/Ids_MP3. On the other hand, the termination resistance adjusting circuit of FIG. 7 according to this exemplary embodiment indicated by the solid line can keep the termination resistance value to be substantially constant to a change of the bias current Iss, that is, a change of the common voltage Vcm.

Figure 10:
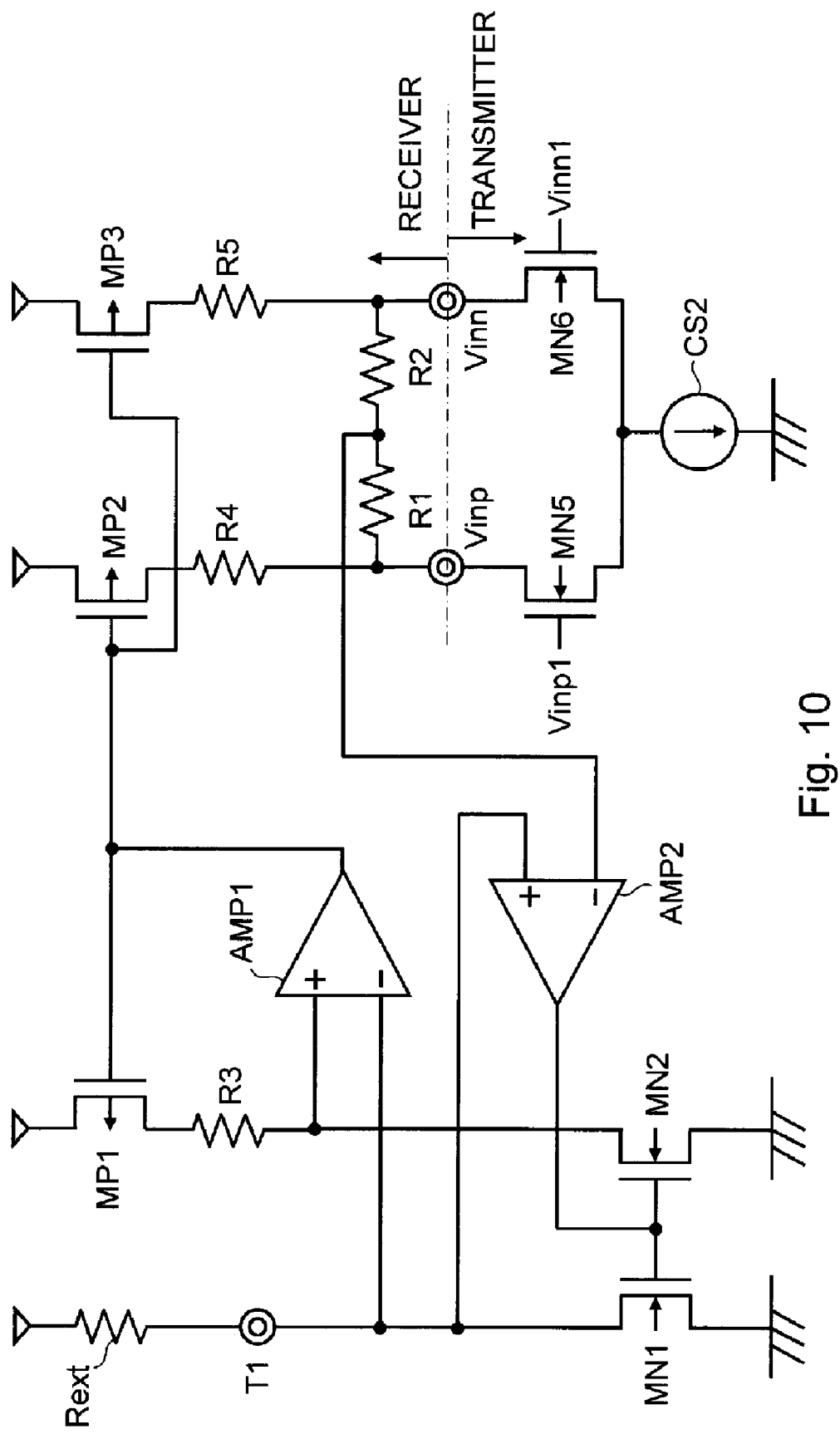
FIG. 10 is a circuit diagram of the termination resistance adjusting circuit according to the third exemplary embodiment.
Figure 11B:
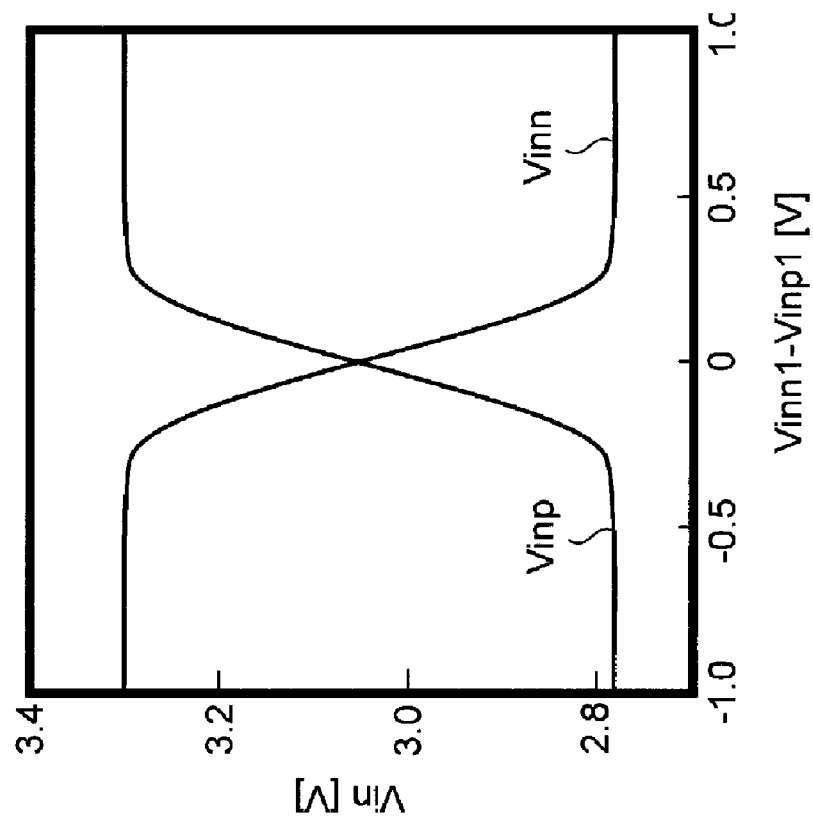
FIG. 11B is a graph illustrating a simulation result of a change of input signals Vinn and Vinp to a receiver.
Figure 11A:
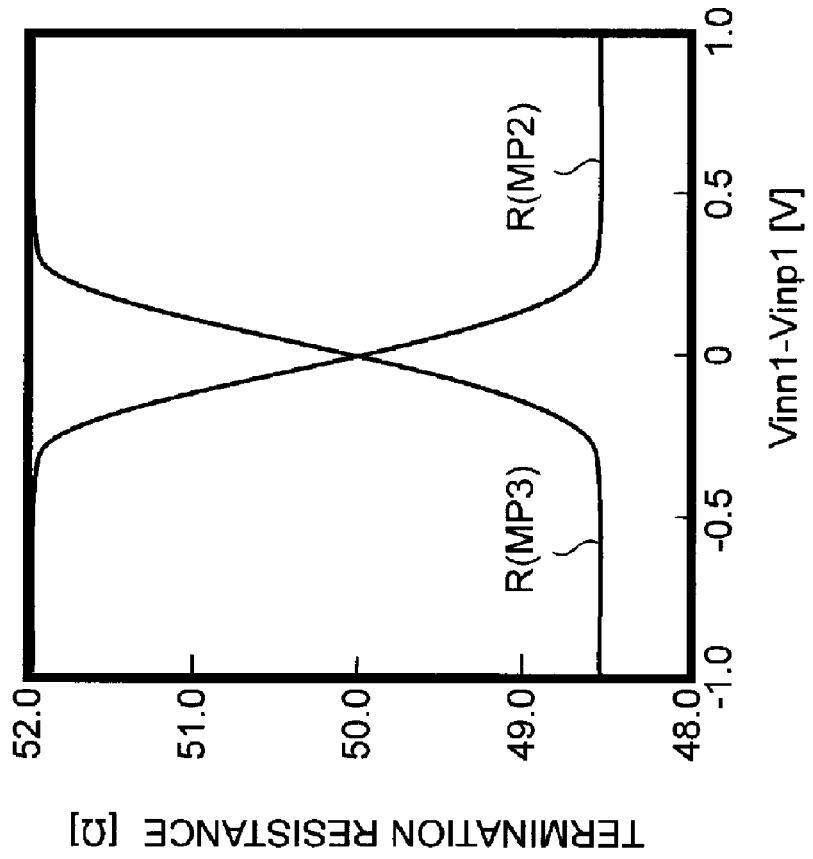
FIG. 11A is a graph illustrating a simulation result of the termination resistance value change to an input signal difference Vinn1−Vinp1 to a transmitter.

FIG. 10 is a circuit diagram of the same termination resistance adjusting circuit as FIG. 7. In FIG. 10, the simulation was performed in the following way. Differential input signals Vinp1 and Vinn1 are input to each gate of the NMOS transistors MN5 and MN6, which are input pair transistors of a transmitter. FIG. 11A is a graph illustrating the simulation result of the change of the termination resistance value to the input signal difference Vinn1−Vinp1 to a transmitter. FIG. 11B is a graph illustrating the simulation result of the change of the input signals Vinn and Vinp to a receiver.

Suppose that the drain source current of the PMOS transistor MP2 is Ids_MP2, then the termination resistance R(MP2) by the PMOS transistors MP2 and the resistor R4 can be expressed as R(MP2)=(VDD−Vinp)/Ids_MP2. Further, suppose that the drain source current of the PMOS transistor MP3 is Ids_MP3, then the termination resistance R(MP3) by the PMOS transistor MP3 and the resistor R5 can be expressed as R(MP3)=(VDD−Vinn)/Ids_MP3.

As illustrated in FIG. 11B, the input signals Vinp and Vinn to the receiver change by the change of the input signal difference Vinn1−Vinp1 to a transmitter. The termination resistances R(MP2) and R(MP3) also change by the change of the input signals Vinp and Vinn to this receiver. At the timing when the input signals Vinp and Vinn to the receiver match, the termination resistances R(MP2) and R(MP3) also match the standard value of 50Ω. Therefore, the termination resistance adjusting circuit according to the present invention enables to effectively reduce jitters.

The first to third exemplary embodiments can be combined as desirable by one of ordinary skill in the art.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

What is claimed is:

1. A termination resistance adjusting circuit comprising:
   a first termination resistor circuit that has a variable resistance;
   a second termination resistor circuit that has a variable resistance, and is connected in parallel with the first termination resistor circuit;
   a resistor circuit for adjustment that adjusts the resistances of the first and second termination resistor circuits;
   a first amplifier circuit that receives a first voltage and a second voltage, equalizes the first and second voltages, and outputs a resistance adjusting signal to the first and second termination resistor circuits, the first voltage being determined by the resistor circuit for adjustment, and the second voltage being determined by a reference resistor connected externally;
   a first terminal connected to the first termination resistor circuit;
   a second terminal connected to the second termination resistor circuit; and
   a second amplifier circuit that receives a voltage based on a common voltage of a differential signal, and one of the first and second voltages, and equalizes the voltage based on the common voltage and the one of the first and second voltages, the differential signal being supplied to the first and second terminals.

2. The termination resistor circuit according to claim 1, wherein each of the resistor circuit for adjustment, the first termination resistor circuit, and the second termination resistor circuit comprises a transistor, and the resistance adjusting signal is input to a control terminal of the each transistor.

3. The termination resistance adjusting circuit according to claim 2, wherein each of the resistor circuit for adjustment, the first termination resistor circuit, and the second termination resistor circuit comprises a plurality of transistors.

4. The termination resistance adjusting circuit according to claim 2, wherein the each transistor has same size.

5. The termination resistance adjusting circuit according to claim 2, wherein the each transistor operates in a linear region.

6. The termination resistance adjusting circuit according to claim 2, wherein each of the resistor circuit for adjustment, the first termination resistor circuit, and the second termination resistor circuit comprises a fixed resistor.

7. The termination resistance adjusting circuit according to claim 1, wherein the resistances of the first and second termination resistor circuits match at a timing in which a value of the differential signal matches.

8. The termination resistance adjusting circuit according to claim 1, further comprising:
- a first current source transistor that is connected in series with the reference resistor; and
- a second current source transistor that is connected in series with the resistor circuit for adjustment,
- wherein an output signal of the second amplifier circuit is input to control terminals of the first and second current source transistors.

9. The termination resistance adjusting circuit according to claim 8, wherein the first and second current source transistors have same size.

10. The termination resistance adjusting circuit according to claim 8, wherein the first and second current source transistors operate in a saturation region.

* * * * *